United States Patent
Tanaka et al.

[19]

[11] Patent Number: 6,085,578
[45] Date of Patent: *Jul. 11, 2000

[54] APPARATUS AND METHOD FOR DETECTING MASS ECCENTRICITY

[75] Inventors: Hiroaki Tanaka; Yoshiyuki Okido; Yutaka Yoshida; Hideki Sano, all of Kobe; Hiroaki Matsubara, Kaizuka, all of Japan

[73] Assignees: Sumitomo Rubber Industries, Ltd., Kobe; Mu Instrument Trading Corp., Sakai, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/083,236

[22] Filed: May 22, 1998

[30] Foreign Application Priority Data

Jul. 17, 1997 [JP] Japan ..................................... 9-209968

[51] Int. Cl.[7] ....................................................... G01M 1/00
[52] U.S. Cl. ............................................................. 73/65.02
[58] Field of Search ................................ 73/65.01, 65.02, 73/65.06, 65.07, 65.09

[56] References Cited

U.S. PATENT DOCUMENTS

| | | | |
|---|---|---|---|
| 4,546,644 | 10/1985 | Beny et al. ............................. | 73/65.02 |
| 5,705,740 | 1/1998 | Unno et al. ............................. | 73/65.09 |

FOREIGN PATENT DOCUMENTS 0381936  5/1973  U.S.S.R. ............................... 73/65.02

*Primary Examiner*—Max Noori
*Attorney, Agent, or Firm*—Armstrong, Westerman, Hattori, McLeland & Naughton

[57] ABSTRACT

A spherical object is positioned on a rotation stage, the rotation stage is rotated, and a deviation detector detects whether the spherical object deviates from the rotation stage or not. A rotation frequency of the rotation stage when the object deviates from the rotation stage is detected by a rotation frequency detector, and a judgement system judges whether the object is mass eccentric or not, comparing the detected rotation frequency with a predetermined rotation frequency which is set beforehand.

9 Claims, 5 Drawing Sheets

APPARATUS AND METHOD FOR DETECTING MASS ECCENTRICITY

BACKGROUND OF THE INVENTION

1. Field of the Invention

This invention relates to an apparatus and a method for detecting mass eccentricity of a spherical object such as a golf ball.

2. Description of the Related Art

Mass eccentricity of an object is generated by deformation of external shape, local defects of surface, and internal defects (such as air inclusion). And, in case that the object comprises plural layers of different specific gravity, mass eccentricity is also generated by ununiformity of thickness of each layer.

As methods for detecting these, visual examination and dimension measurement have been practiced in deformation of external shape and defects of the surface. For internal defects and ununiformity of thickness of each layer in a multilayer structure which includes plural layers of different specific gravity, in case of non-destructive examination, X-ray image observation and supersonic wave measurement have been practiced, and in case of destructive examination, measurement of cross section has been practiced. That is to say, these methods do not measure the mass eccentricity itself but detect causes of generation.

In case that the causes of the mass eccentricity are internal defects and ununiformity of thickness of each layer in the multilayer structure which includes plural layers of different specific gravity, however, positions of the internal defects and mass eccentricity caused by the internal defects are not known quantitatively, since only permeation speed is observed in the supersonic wave measurement. Although the internal defects and the mass eccentricity can be known with the X-ray image observation in some cases, in case that material near the surface of the examined object includes atoms of high X-ray absorptivity, obtaining quantitative information of the internal defects and the mass eccentricity is difficult, since obtaining good X-ray images is difficult.

Further, in these cases, it is difficult to directly know influences of mass eccentricity of a rotating product in actual use, because the causes of mass eccentricity generation are detected individually and the mass eccentricity is not measured in totality.

It is therefore an object of the present invention to provide an apparatus and a method for detecting mass eccentricity which can easily and surely detect mass eccentricity of a product which rotates in actual use (a golf ball etc.) in totality.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
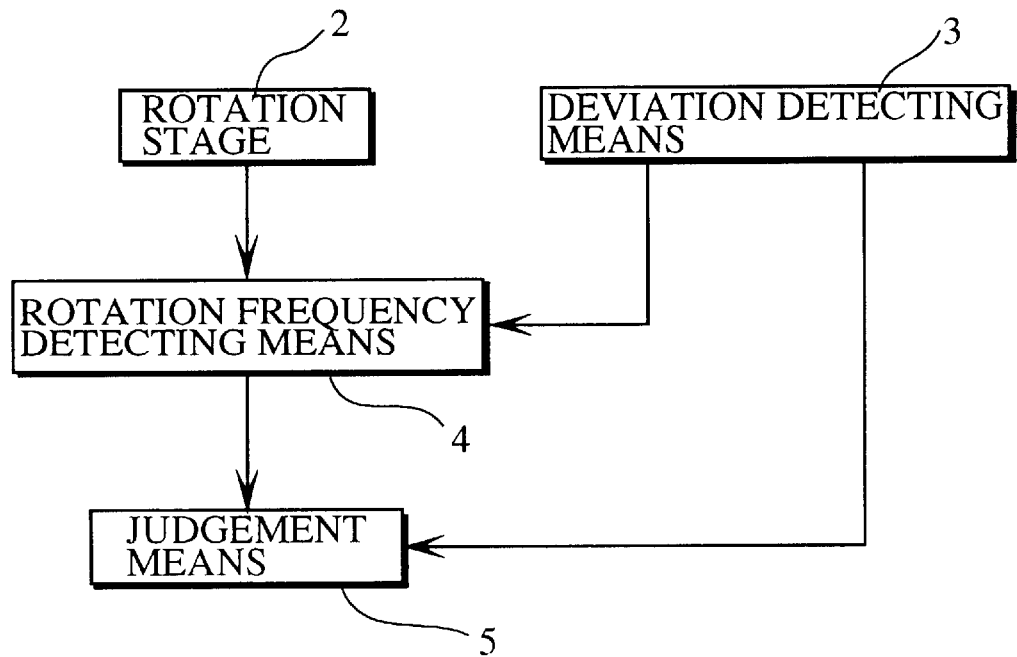
FIG. 1 is a block diagram of an apparatus for detecting mass eccentricity according to the present invention.

FIG. 1 shows an apparatus for detecting mass eccentricity according to the present invention which has a rotation stage 2 on which a spherical object 1 is placed and rotates around a rotation shaft center L (see FIG. 2), a deviation detecting means 3 which detects deviation of the object 1 from the rotation stage 2 caused by rotation of the rotation stage 2, a rotation frequency detecting means 4 which detects rotation frequency of the rotation stage 2 when the object 1 deviates from the rotation stage 2, and a judgement means 5 which judges whether the object 1 is mass eccentric or not based on the rotation frequency of the rotation stage 2 detected by the rotation frequency detecting means 4. The judgement means 5 can also judge whether the object 1 is mass eccentric or not based on the detection of the deviation in a predetermined rotation frequency of the rotation stage 2 detected by the deviation detecting means 3. The spherical object 1 is a product which rotates in use, for example, a golf ball etc.

The rotation stage has a disc portion 7, a placement portion 6 which consists of the disc portion 7 and a vertical wall of circumferential direction 8 arranged on a peripheral edge of the disc portion 7, and a shaft portion 16 which protrudes perpendicularly from the placement portion 6. The object 1 is placed on the placement portion 6, and rotated around the rotation shaft center L by a driving means not shown in Figures which has a motor etc. In this case, a center O of the object 1 is arranged to be on the rotating shaft center L of the rotation stage 2. Rotation frequency of the rotation stage 2 around the shaft center L is increasable and decreasable, and the rotation frequency is detected by the rotation frequency detecting means 4. And, after the object 1 is placed on the rotation stage 2, the object 1 deviates (falls) from the rotation stage 2 for centrifugal force which works on the object 1 caused by the rotation around the shaft center L of the rotation stage 2.

Figure 2:
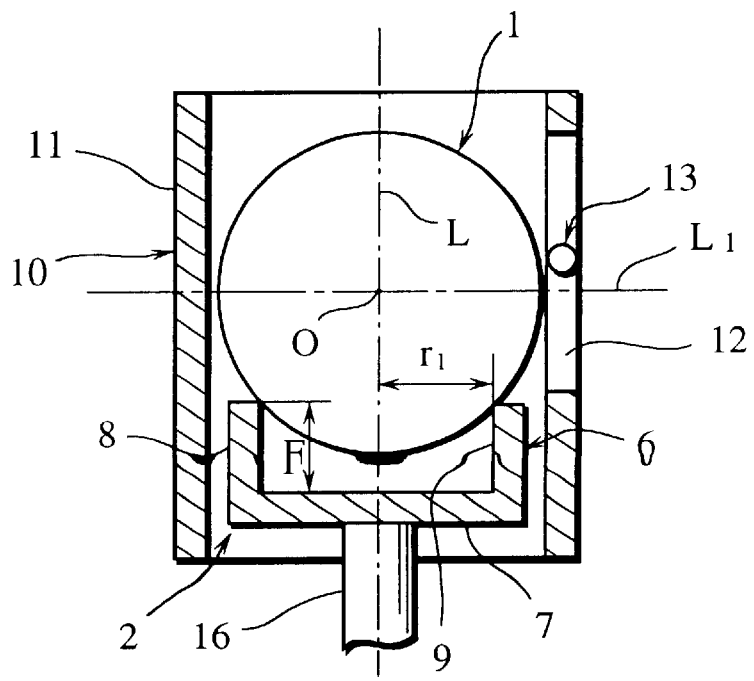
FIG. 2 is a cross-sectional view of a rotation stage.
Figure 5:
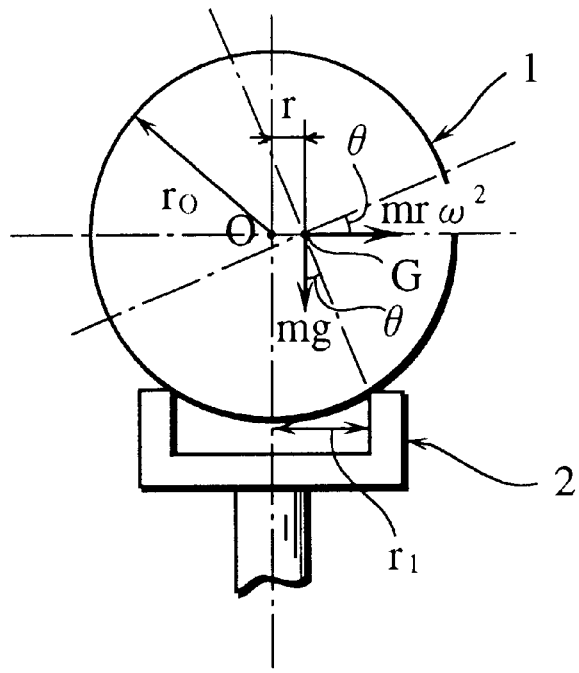
FIG. 5 is an explanatory view of a principle of deviation.

Depth of the rotation stage 2, namely, a depth F of a concave portion 9 to which a part of the object 1 fits as shown in FIG. 2, and a radius dimension $r_1$ of the concave portion 9 etc. vary depending on the size of the object 1 and degree of a mass eccentric quantity r (see FIG. 5). For example, when a golf ball is used as the object 1, the depth F is arranged to be 1 mm to 20 mm, and the radius dimension $r_1$ is arranged to be 5 mm to 20 mm. That is to say, the depth F and the radius dimension $r_1$ are arranged as that the object 1 (golf ball) does not touch the bottom of the concave portion 9.

A thickness T of the rotation stage 2 which varies depending on materials of the rotation stage 2 is arranged to be 0.5 mm to 3.0 mm when the materials are metal, plastic, or ceramic. Because if the thickness T is less than 0.5 mm, the rotation stage 2 is inferior in strength, and if the thickness T is over 3.0 mm, weight of the rotation stage 2 increases, and inertia of the rotation stage 2 becomes so much that rapid acceleration and rapid deceleration can not be attained.

And, as shown in FIG. 2, a prevention frame 10 which prevents the object 1 to spring out of the apparatus is arranged around the rotation stage 2 (this prevention frame 10 is supported by a supporting mechanism not shown in Figures). The prevention frame 10 is formed with a short cylinder, a window portion 12 is arranged on a part of a peripheral wall 11 of the short cylinder, and the window portion 12 is provided with a sensor 13 which composes the above-mentioned deviation detecting means 3. That is to say, in case that the object 1 deviates from the rotation stage 2 for the rotation around the rotation shaft center L of the rotation stage 2, although the object 1 tends to spring out of the apparatus through the window portion 12, size of the window portion 12 is arranged to be smaller than the size of the object 1, and the object 1 does not spring out of the apparatus through the window portion 12.

Figure 8:
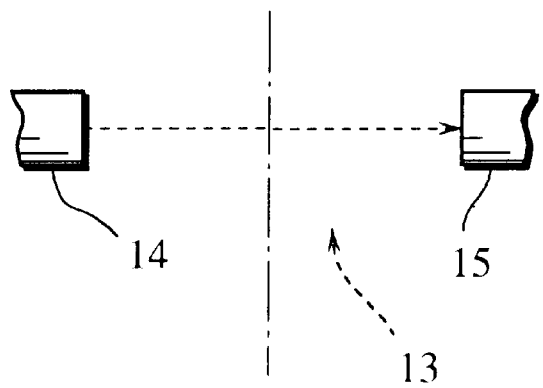
FIG. 8 is a schematic view of a sensor.

The sensor 13 has, for example, as shown in FIG. 8, a flood lamp 14 which emits light and a light acceptor 15 which accepts and detects the light emitted from the flood lamp 14. The light emitted from the flood lamp 14 is interrupted by the object 1 which gets in the window portion 12, and the deviation of the object 1 from the rotation stage 2 is detected thereby. As the flood lamp 14, for example, a photoelectric tube etc. are used.

Figure 6:
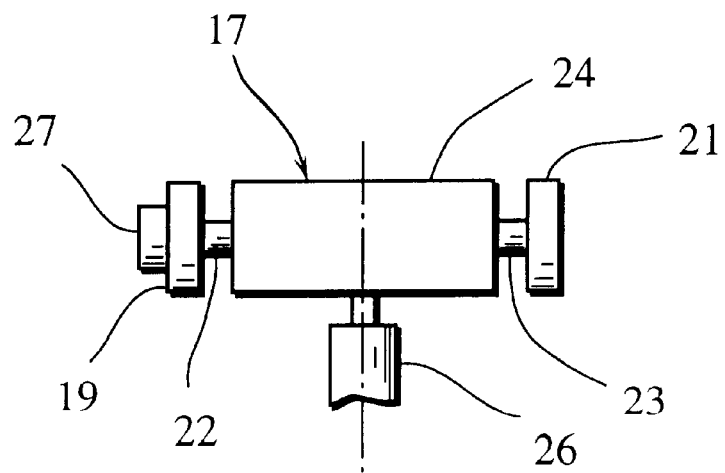
FIG. 6 is a schematic front view of a positioning mechanism.
Figure 7:
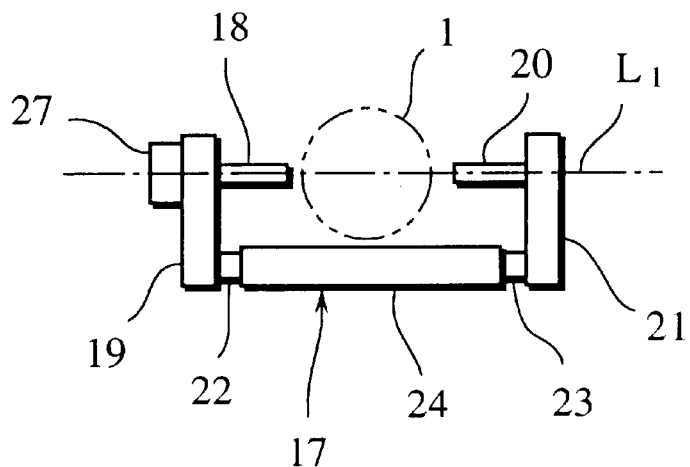
FIG. 7 is a schematic top view of a positioning mechanism.

When the object 1 is placed on the rotation stage 2, a positioning mechanism 17 as shown in FIG. 6 and FIG. 7 is used. The positioning mechanism 17 has a holding member 19 having a supporting shaft 18, a holding member 21 having a supporting shaft 20, rods 22 and 23 which reciprocate the holding members 19 and 21 respectively in approaching and parting direction, a base member 24 which supports the rods 22 and 23 respectively as to be capable of expansion and contraction (this base member 24 and the rods 22 and 23 form a cylinder), and a cylinder 26 which moves the base member 24 up-and-down. And, the supporting shaft 18 and the supporting shaft 20 are arranged on a same shaft center $L_1$, a motor 27 such as a Pulse motor etc. is interlockingly connected with the supporting shaft 18, the supporting shaft 18 rotates along with the drive of the motor 27, and the supporting shaft 20 is rotatable freely around the shaft center $L_1$. Further, it is preferable to arrange the above-mentioned shaft center $L_1$ as to be at right angles with the former-described shaft center L. In other words, the shaft center $L_1$ is in horizontal direction.

Therefore, in a state that the holding member 19 and the holding member 21 are apart from each other, the object 1 is positioned between the holding member 19 and the holding member 21, and the holding member 19 and the holding member 21 are approached each other, the object 1 can be held by the holding members 19 and 21 thereby. Reversely, in this holding state, the holding member 19 and 21 are made apart each other, the holding is released, and the object 1 can be released from the positioning mechanism 17 thereby.

That is to say, the holding members 19 and 21 are arranged above the rotation stage 2, the object 1 is held between the holding members 19 and 21 in a state that the base member 24 is raised, the object 1 is placed on the rotation stage 2 with lowering the holding members 19 and 21, then, the holding members 19 and 21 are made apart each other, and the object 1 is set on the rotation stage 2 thereby. During this process, the direction of the shaft center $L_1$ of the supporting shafts 18 and 19 of the holding members 19 and 21 is at right angles with the rotation shaft center L. And, in case that the object 1 is set by using the positioning mechanism 17, it is necessary to move the prevention frame 10 from the rotation stage 2.

And, in case that the object 1 is set with the positioning mechanism 17, the object 1 can be rotated around the shaft center $L_1$ for a predetermined angle by the motor 27, and position (direction) of the object 1 to the rotation shaft center L of the rotation stage 2 when the object 1 is set can be changed thereby. That is to say, in a first state that the object 1 is firstly set, the object 1 is rotated around the shaft center $L_1$ for a predetermined angle, and the object 1 is set with a rotation around the shaft center $L_1$ for the predetermined angle from the first state. Therefore, if the object 1 is set with a rotation around the shaft center $L_1$ for a predetermined angle sequentially by the positioning mechanism 17, the position (direction) of the object 1 to the rotation shaft center L can be changed sequentially.

Next, conditions of falling (deviation) of the object 1 from the rotation stage 2 when the object 1 is placed on the rotation stage 2 and rotated is explained referring to FIG. 5.

In this case, position of a center of gravity G of the object 1 is a position distant from a center O of the object 1 for r (mass eccentric quantity) in a horizontal plane which includes the shaft center $L_1$. And, m represents mass of the object 1, $r_0$ represents radius of the object 1, g represents gravitational acceleration, $r_1$ represents radius of the rotation stage 2, and ω represents angular velocity. Therefore, when they are in a relationship expressed by a formula of mg sin θ<mrω² cos θ, th object 1 falls from the rotation stage 2, and if the relationship is expressed by a formula of mg sin θ≧mrω² cos θ, the object 1 does not fall from the rotation stage 2. θ is expressed by following Formula 1.

$$\tan\theta = \frac{r_1 - r}{\sqrt{r_0^2 - r_1^2}} \quad (1)$$

And, radius $r_1$ of the rotation stage 2 is depending on the degree of mass eccentricity to be measured, and expressed by following Formula 2.

$$r_1 = \frac{g^2 r + r\omega^2 \sqrt{g^2 r_0^2 - g^2 r^2 + \omega^4 r^2 r_0^2}}{g^2 + r^2 \omega^4} \quad (2)$$

Concretely, in case that the mass eccentric quantity r is arranged to be, for example, 0.2 mm (a quantity with which the object 1 has inferior flying ability when the object 1 is a golf ball), the angular velocity ω (rotation frequency) of the rotation stage 2 is, when the rotation stage 2 is directly connected to a motor and the ratio of rotation frequency of the rotation stage 2 to rotation frequency of the motor is 1:1, restricted to less than 3000 r.p.m., preferably to a range of 1000 r.p.m. to 2500 r.p.m., and concretely, the rotation frequency is arranged to be 1520 r.p.m.. And $r_1 \approx 10$ mm consequently.

Next, a method to judge whether the spherical object 1 is mass eccentric or not with the above-described apparatus will be described. First, a condition of falling of the object 1 is obtained. That is to say, the angular velocity ω (predetermined rotation frequency) is obtained by a formula obtained from mg sin θ≧mrω² cos θ, namely, following Formula 3, this predetermined rotation frequency is used as a standard rotation frequency for judgement of mass eccentricity, and the mass eccentric quantity which is more than a predetermined quantity (0.2 mm, for example) is detected.

$$\omega = \sqrt{\frac{g \sin\theta}{r \cos\theta}} = \sqrt{\frac{g}{r}\tan\theta} = \sqrt{\frac{g}{r} \cdot \frac{r_1 - r}{\sqrt{r_0^2 - r_1^2}}} \qquad (3)$$

Figure 3:
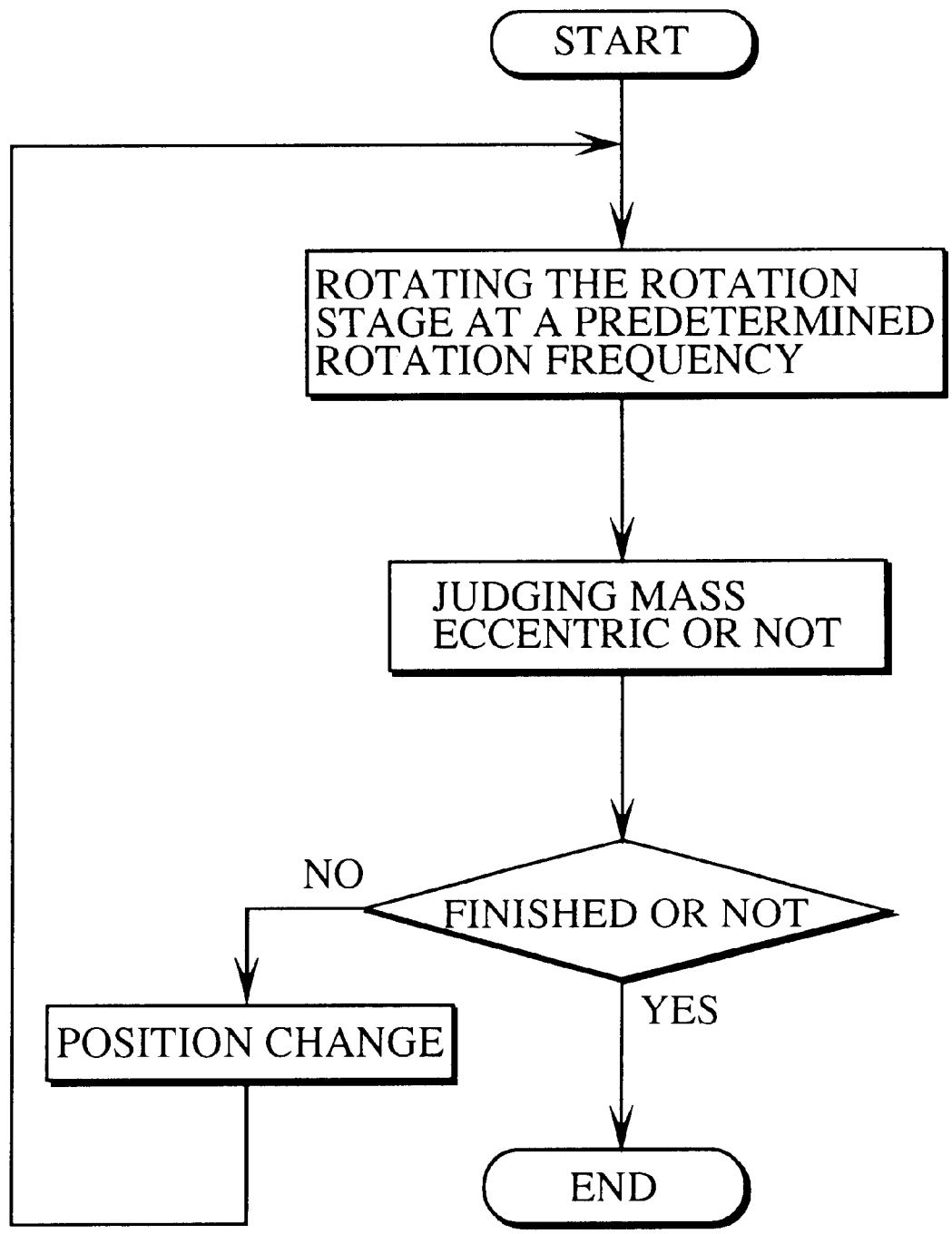
FIG. 3 is a flow chart of a method for detecting mass eccentricity according to the present invention.

Concretely, the above-described golf ball (the object 1) is set on the rotation stage 2 through the positioning mechanism 17. And, as shown in a flow chart of FIG. 3, the rotation stage 2 is rotated at the standard rotation frequency (1520 r.p.m. for example). If the object 1 falls (deviates), it is detected by the deviation detecting means 3, and whether the object 1 is mass eccentric or not is judged by the above-mentioned judgement means 5. That is to say, if the object 1 deviates, the object 1 is judged as mass eccentric.

As shown in FIG. 5, however, judgement with the standard rotation frequency is possible only when the position of the center of gravity is on a horizontal plane which goes through the center of the object 1. It is uncertain whether this condition is fulfilled when the object 1 is set on the rotation stage 2, so it is necessary to change position of the object 1 to the rotation shaft center L and examine sequentially.

Therefore, in case that the object 1 does not fall, the position of the object 1 is changed, then the above judgement is conducted again. That is to say, to judge whether the detection is finished or not, in case that the object 1 falls, the detection is finished, and in case that the object 1 does not fall, judgement is conducted with changed position of the object 1. Concretely, the object 1 is rotated around the shaft center $L_1$ for a predetermined angle (for example, 5°), and the rotation stage 2 is rotated around the shaft center L again and the examination above is conducted again. If the object 1 still does not fall, the object 1 is rotated around the shaft center $L_1$ for a predetermined angle (for example, 5°) again, and the examination above is conducted again. Whether the object 1 is mass eccentric or not can be judged with this judgement conducted sequentially. That is to say, if the position of the center of gravity is not on the horizontal plane which includes the shaft center $L_1$ firstly, the center of gravity can be approximately positioned on the horizontal plane with the sequential rotations of the object 1 around the shaft center $L_1$ for the predetermined angle, and whether the object 1 is mass eccentric or not is surely judged based on the above-described standard rotation frequency. In this case, the object 1 which does not deviate at the standard rotation frequency in all positions of the sequential position change and the examination is judged as not being mass eccentric.

Although the judgement is conducted with the rotation stage 2 rotated at the standard rotation frequency in the above-described case, the judgement may be conducted with changing rotation frequency.

Figure 4:
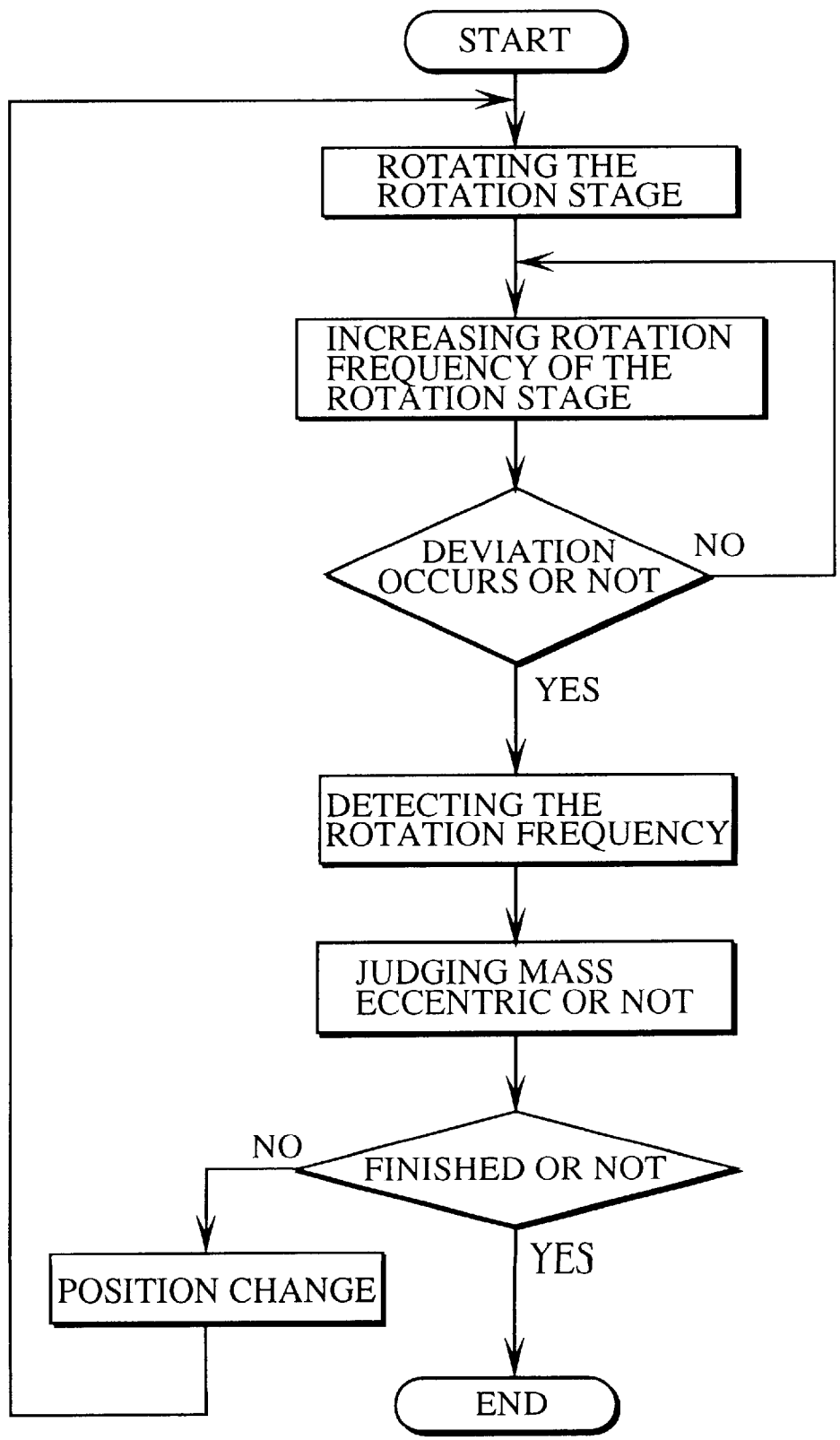
FIG. 4 is another flow chart of a method for detecting mass eccentricity according to the present invention.

That is to say, as shown in a flow chart of FIG. 4, the rotation stage 2 is rotated, then rotation frequency is gradually increased, whether the object 1 deviates or not is judged, a rotation frequency when the object 1 deviates is detected. In case that the object 1 does not deviate, the rotation frequency is increased until the object 1 deviates.

And, whether the object 1 is mass eccentric or not is judged with the rotation frequency when the object 1 deviates. That is to say, when the rotation frequency is lower than the standard rotation frequency, the object 1 is judged as mass eccentric. And, also in this case, as shown in FIG. 5, judgment with the standard rotation frequency is possible only when the position of the center of gravity is on the horizontal plane which goes through the center of the object 1. It is preferable to change the position of the object 1 to the rotation shaft center L by rotating the object 1 around the shaft center $L_1$, since it is uncertain whether this condition is fulfilled or not.

That is to say, in case that the rotation frequency when the object 1 deviates (falls) is more than the standard rotation frequency, the object 1 is rotated around the shaft center $L_1$ for a predetermined angle (for example, 5°), the object 1 is set again, and the above judgement is conducted again. If the object 1 still does not fall, the object 1 is rotated around the shaft center $L_1$ for a predetermined angle (for example, 5°) again, and the examination above is conducted again. Whether the object 1 is mass eccentric or not can be judged with this judgement conducted sequentially. In this case, the object 1 which does not deviate at a rotation frequency more than the standard rotation frequency in all positions (states) of the sequential position change and the examination is judged as not being mass eccentric (being non-defective).

The rotation angle of the shaft center $L_1$ when the position of the object 1 is changed to the rotation shaft center L may be more than 5° or less than 5°, not being restricted to the above-mentioned 5°. And, a tennis ball, a baseball, etc. may be used as the object 1 which is not restricted to a golf ball. Further, various mass eccentric quantities may be used as the mass eccentric quantity to be detected which is not restricted to 0.2 mm. That is to say, the above-described standard rotation frequency is changeable. And, although there are two cases in one of which the judgement means 5 judges mass eccentricity based on deviation detection at a predetermined rotation frequency, and in the other of which the judgement means 5 judges mass eccentricity based on rotation frequency when the object 1 deviates from the rotation stage 2 of which rotation frequency changes, these two cases may be separated and used as two individual judgement means.

Next, examples of the present invention will be described.

A golf ball (a two piece ball) is used as the object 1, and mass eccentric quantity r more than 0.2 mm with which flying ability of the object 1 becomes inferior is detected among 5 golf balls (ball ① through ball ⑤).

Firstly, condition of falling is being obtained. In this case, as shown in FIG. 5, position of the center of gravity of the object 1 is arranged to be on a horizontal plane which goes through the center of the object 1, diameter of the object 1 ($2 \times r_0$) is arranged to be 42.8 mm, and diameter of the rotation stage 2 ($2 \times r_1$) is arranged to be 20 mm.

And, the angular velocity ω is obtained by substitution of r, $r_0$, $r_1$, and gravitational acceleration 9.8 m/s² in Formula 3. To convert the angular velocity ω into rotation frequency, ω is approximately 1520 r.p.m., and in case that rotation frequency of the object 1 when the object 1 falls (deviates) is less than the set rotation frequency, the object 1 is judged as defective (mass eccentric). Also the position of the object 1 to the rotation shaft center L is changed sequentially for 5° each time and the judgement is conducted. And, the result, namely, rotation frequency (r.p.m.) when the object 1 falls in each position, is shown in following Table 1.

TABLE 1

| | ROTATION FREQUENCY (r.p.m.) | | | | | | | | | | | | | |
|---|---|---|---|---|---|---|---|---|---|---|---|---|---|---|
| | 0° | 5° | 10° | 15° | 20° | 25° | 30° | 35° | 40° | 45° | 50° | 55° | 60° | 360° |
| BALL ① | 1770 | 1710 | 1660 | 1630 | 1600 | 1580 | 1560 | 1550 | 1550 | 1560 | 1560 | — | — | 1770 |
| BALL ② | 1790 | 1710 | 1640 | 1600 | 1550 | 1510 | 1480 | 1460 | 1450 | 1440 | 1440 | 1440 | 1450 | 1790 |
| BALL ③ | 1780 | 1740 | 1710 | 1690 | 1670 | 1660 | 1660 | 1660 | — | — | — | — | — | 1780 |
| BALL ④ | 1780 | 1750 | 1730 | 1710 | 1700 | 1700 | 1700 | — | — | — | — | — | — | 1780 |
| BALL ⑤ | 1770 | 1720 | 1680 | 1650 | 1630 | 1610 | 1600 | 1600 | 1600 | — | — | — | — | 1770 |

As shown in Table 1, ball ① of which lowest rotation frequency is 1550 r.p.m. is a normal product (mass eccentric quantity is less than 0.2 mm), ball ② of which lowest rotation frequency is 1440 r.p.m. is a defective product (mass eccentric quantity is more than 0.2 mm), ball ③ of which lowest rotation frequency is 1660 r.p.m. is a normal product, ball ④ of which lowest rotation frequency is 1100 r.p.m. is a normal product, and ball ⑤ of which lowest rotation frequency is 1600 r.p.m. is a normal product.

Therefore, according to an apparatus for detecting mass eccentricity of the present invention, mass eccentricity directly concerning use of products can be accurately and easily detected in totality without destruction of the examined object (the object 1) and irradiation of X-ray, and the detecting process becomes stable.

And, according to a method for detecting mass eccentricity of the present invention, mass eccentricity of the object 1 is quite easily and accurately detected, without damaging the examined object (the object 1).

While preferred embodiments of the present invention have been described in this specification, it is to be understood that the invention is illustrative and not restrictive, because various changes are possible within the spirit and the indispensable features.

What is claimed is:

1. An apparatus for detecting mass eccentricity, comprising:
   a rotation stage on which a spherical object is placed;
   a deviation detecting means which detects deviation of the object from the rotation stage caused by rotation of the rotation stage; and
   a rotational frequency detecting means which detects rotational frequency of the rotation stage;
   a judgment means which judges whether the object is mass eccentric or not based on the deviation detection by the deviation detecting means at a predetermined standard rotational frequency of the rotation stage.

2. An apparatus for detecting mass eccentricity, comprising:
   a rotation stage on which a spherical object is placed;
   a positioning mechanism for placing the object on the rotation stage with changing direction of the object;
   a deviation detecting means which detects deviation of the object from the rotation stage caused by rotation of the rotation stage; and
   a rotational frequency detecting means which detects rotational frequency of the rotation stage;
   a judgment means which judges whether the object is mass eccentric or not based on the deviation detection by the deviation detecting means at a predetermined standard rotational frequency of the rotation stage in each direction of the object.

3. An apparatus for detecting mass eccentricity, comprising:
   a rotation stage on which a spherical object is placed and of which rotational frequency around a rotation shaft center of the rotation stage is changeable;
   a deviation detecting means which detects deviation of the object from the rotation stage caused by rotation of the rotation stage;
   a rotational frequency detecting means which detects rotational frequency of the rotation stage when the object deviates from the rotation stage; and
   a judgment means which judges whether the object is mass eccentric or not based on the rotational frequency of the rotation stage detected by the rotational frequency detecting means.

4. An apparatus for detecting mass eccentricity, comprising:
   a rotation stage on which a spherical object is placed and of which rotational frequency around a rotation shaft center of the rotation stage is changeable;
   a positioning mechanism for placing the object on the rotation stage with changing direction of the object;
   a deviation detecting means which detects deviation of the object from the rotation stage caused by rotation of the rotation stage;
   a rotational frequency detecting means which detects rotational frequency of the rotation stage when the object deviates from the rotation stage; and
   a judgment means which judges whether the object is mass eccentric or not based on the rotational frequency of the rotation stage detected by the rotational frequency detecting means in each direction of the object.

5. A method for detecting mass eccentricity, comprising the steps of:
   placing a spherical object on a rotation stage;
   rotating the rotation stage at a predetermined standard rotational frequency; and
   detecting rotational frequency of the rotation stage;
   judging whether the object is mass eccentric or not based on whether the object deviates or not from the rotation stage detected by a sensor arranged near the rotation stage.

6. A method for detecting mass eccentricity, comprising the steps of:
   placing a spherical object on a rotation stage with changing direction of the object plural times sequentially;

rotating the rotation stage at a predetermined standard rotational frequency in each direction of the object; and detecting rotational frequency of the rotation stage;

judging whether the object is mass eccentric or not based on confirming whether the object deviates or not from the rotation stage detected by a sensor arranged near the rotation stage in each direction of the object.

7. A method for detecting mass eccentricity, comprising the steps of:

placing a spherical object on a rotation stage of which rotational frequency around a rotation shaft center of the rotation stage is changeable;

increasing rotational frequency of the rotation stage gradually;

detecting rotational frequency of the rotation stage when the object deviates from the rotation stage; and judging whether the object is mass eccentric or not based on the rotational frequency of the rotation stage when the object deviates from the rotation stage.

8. A method for detecting mass eccentricity, comprising the steps of:

placing a spherical object on a rotation stage with changing direction of the object plural times sequentially;

rotating the rotation stage in each direction of the object;

detecting rotational frequency of the rotation stage when the object deviates from the rotation stage in each direction of the object; and judging whether the object is mass eccentric or not based on the rotational frequency of the rotation stage when the object deviates from the rotation stage in each direction of the object.

9. The apparatus for detecting mass eccentricity as set forth in claim 1, 2, 3, or 4, in which the deviation detecting means comprises a sensor arranged near the rotation stage.

* * * * *